US008296673B2

(12) United States Patent
Lipstein et al.

(10) Patent No.: US 8,296,673 B2
(45) Date of Patent: Oct. 23, 2012

(54) COLLAPSIBLE TABBED USER INTERFACE

(75) Inventors: Shawn Allan Michael Lipstein, Seattle, WA (US); Jonathan Fred Kern, Seattle, WA (US); Jeffrey Charles Dunn, Seattle, WA (US); Monica Estela Gonzalez Veron, Seattle, WA (US); Gail Borod Giacobbe, Seattle, WA (US); Jason Frank Morrill, Redmond, WA (US); Timothy Paul McConnell, Kirkland, WA (US); John Spencer Pruitt, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 12/765,867

(22) Filed: Apr. 23, 2010

(65) Prior Publication Data
US 2011/0265027 A1    Oct. 27, 2011

(51) Int. Cl.
*G06F 3/048* (2006.01)
(52) U.S. Cl. .................................. 715/777; 715/786
(58) Field of Classification Search .................. 715/777, 715/786, 784
See application file for complete search history.

(56) References Cited

U.S. PATENT DOCUMENTS

| | | | |
|---|---|---|---|
| 7,272,790 B2 * | 9/2007 | Fabritius ........................ | 715/209 |
| 2006/0036964 A1 | 2/2006 | Satterfield et al. | |
| 2006/0036965 A1 * | 2/2006 | Harris et al. .................. | 715/777 |
| 2006/0174214 A1 * | 8/2006 | McKee et al. ................. | 715/802 |
| 2006/0236261 A1 * | 10/2006 | Forstall et al. ................ | 715/784 |
| 2007/0055943 A1 | 3/2007 | McCormack et al. | |
| 2008/0244440 A1 | 10/2008 | Bailey et al. | |
| 2008/0244443 A1 | 10/2008 | Schaw et al. | |

OTHER PUBLICATIONS

Moise, Wesner., "Ribbon UI", Retrieved at << http://wesnerm.blogs.com/net_undocumented/2007/08/ribbon-ui.html>>, Aug. 17, 2007, pp. 3.
"SharePoint 2010 Ribbon Customization—Server-Side Command Handling", Retrieved at << http://www.projectserver2010blog.com/2010/01/sharepoint-2010-ribbon-customization_06.html >>, Jan. 6, 2010, pp. 4.
Rice, et al., "Customizing the 2007 Office Fluent Ribbon for Developers (Part 1 of 3)", Retrieved at << http://msdn.microsoft.com/en-us/library/aa338202.aspx >>, May 2006, pp. 26.
"Ultratoolbar RibbonGroup Scroll is not Present at Runtime", Retrieved at << http://blogs.infragistics.com/forums/p/4897/22842.aspx >>, Mar. 17, 2008, pp. 2.
"Open Web Studio", Retrieved at << http://lab.r2integrated.com/Wiki.aspx?topic=Open_Web_Studio >>, Retrieved Date: Feb. 17, 2010, pp. 3.
"Elegant Ribbon", Retrieved at << http://www.prof-uis.com/elegant-ribbon/controls-framework-overview.aspx?gclid=CNvV25yW958CFZAA4wod_k98YA >>, Retrieved Date: Feb. 17, 2010, pp. 3.

* cited by examiner

*Primary Examiner* — Omar Abdul-Ali
(74) *Attorney, Agent, or Firm* — Hope Baldauff Hartman, LLC

(57) ABSTRACT

A tab-based collapsible user interface includes selectable user interface tabs, a ribbon area, and an editing surface. When a browse tab is selected, the ribbon area displays information and does not include any user interface controls for performing commands. When the browse tab is selected, a vertical scroll bar is displayed adjacent to the ribbon area and the editing surface. When the vertical scroll bar is used, the ribbon area and the editing surface are both scrolled. When a page tab or a contextual tab is selected, the ribbon area displays user interface controls for performing commands. When a page tab or a contextual tab is selected, a vertical scroll bar is displayed adjacent to the editing surface but not adjacent to the ribbon area. When the vertical scroll bar is used, the contents of the editing surface are scrolled but the ribbon area is not scrolled.

20 Claims, 15 Drawing Sheets

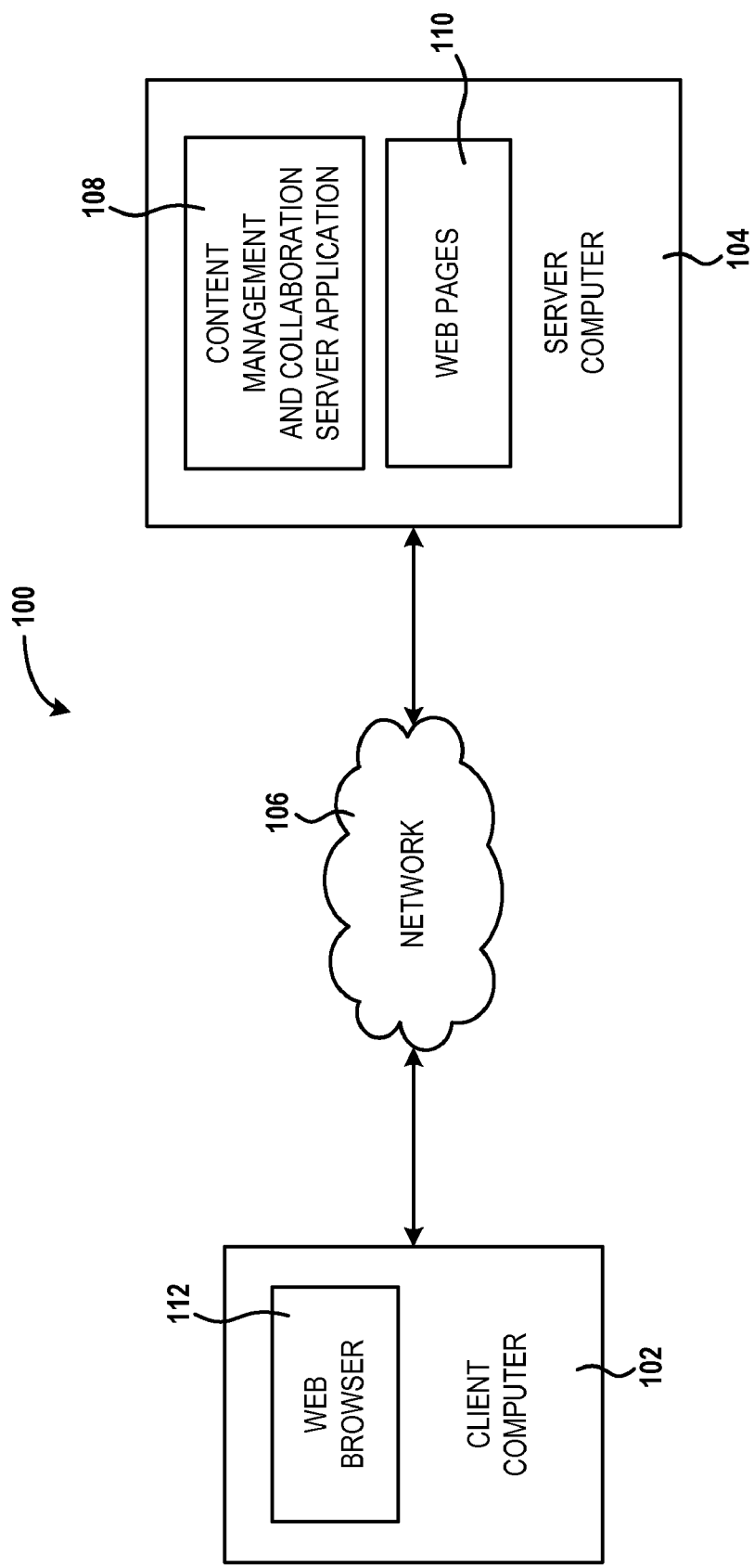

COLLAPSIBLE TABBED USER INTERFACE

BACKGROUND

It can be difficult to port a software application from a traditional desktop application program to a World Wide Web ("Web")—based application. One reason for this is that there is generally less space available within a Web browser application window than in a typical desktop application window. This is because a Web browser application window typically includes navigation controls and possibly other toolbars. These controls and toolbars can take up a considerable portion of the Web browser application window, thereby limiting the amount of window space that is usable for display by a Web-based application. Standard desktop applications are typically not hampered by such a limitation and, as a result, a direct conversion of the user interface of a desktop application to Web-based application may be difficult.

It is with respect to these and other considerations that the disclosure made herein is presented.

SUMMARY

Technologies are described herein for providing a collapsible tabbed user interface. Through the utilization of the technologies and concepts presented herein, a Web-based application can maximize the utilization of available space within a Web browser application window. In particular, a tab-based user interface is provided that is capable of collapsing a portion of the user interface when it is unnecessary to display user interface controls for performing commands. In this manner, the available space within a Web browser application window can be used more efficiently.

According to one aspect presented herein, a tab-based collapsible user interface is provided that includes two or more selectable user interface tabs, an information/ribbon area (referred to herein as the "ribbon area" or the "ribbon"), and an editing surface. The selectable user interface tabs may be adjacent to one another. The ribbon area may be displayed adjacent to and below the selectable user interface tabs. The editing surface may be displayed adjacent to and below the ribbon area. The tabs, ribbon area, and editing surface might also be displayed in other configurations.

The ribbon area is utilized to display information and to display selectable user interface controls for performing commands. The editing surface is utilized to display and edit information. For instance, the editing surface might be utilized to display a list of documents, to display one of the documents in the list, and to edit one of the documents in the list. The ribbon area might be utilized to display information regarding the documents, and to display user interface controls for accessing functionality for editing the documents, for instance.

According to another aspect, when one of the selectable user interface tabs (referred to herein as the "browse tab") is selected, the ribbon area is utilized to display information and does not include any user interface controls for performing commands. Additionally, when the browse tab is selected, a vertical scroll bar may be displayed adjacent to both the ribbon area and the editing surface. When the vertical scroll bar is selected in order to scroll the contents of the editing surface, the ribbon area and the editing surface are both scrolled. The ribbon area may scroll out of view, thereby effectively collapsing the ribbon area and allowing a greater portion of the editing surface to be displayed within a Web browser window.

According to yet another aspect, when a second of the selectable user interface tabs (referred to herein as a "page tab" or a "contextual tab") is selected, the ribbon area is utilized to display user interface controls for performing commands. Additionally, when a page tab or a contextual tab is selected, a vertical scroll bar may be displayed adjacent to the editing surface but not adjacent to the ribbon area. When the vertical scroll bar is selected in order to scroll the contents of the editing surface, the contents of the editing surface are scrolled but the ribbon area is not scrolled. In this manner, the user interface controls for performing commands displayed in the ribbon area are continually displayed for use even when the contents of the editing surface are scrolled.

According to another aspect, the user interface controls for performing commands that are displayed in the ribbon area may be customized based upon the contents of the editing surface. In this manner, commands appropriate for the content displayed in the editing surface may be made available, while inappropriate commands are hidden. Similarly, an appropriate tab may be auto-selected in response to commands performed in the editing surface or elsewhere. For instance, a tab with the appropriate commands for editing a document in the ribbon area may be auto-selected in response to receiving a command to edit the document. A tab might also be auto-selected in response to the occurrence of other types of actions.

It should be appreciated that the user interface controls described herein are merely illustrative and that other types of user interface controls might be utilized in place of or in addition to those described herein. For instance, although the embodiments presented herein refer to a vertical scroll bar, other types of user interface controls such as arrows might be utilized for initiating a scroll operation. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a network diagram showing one illustrative operating environment for embodiments presented herein;

DETAILED DESCRIPTION

Figure 2A:
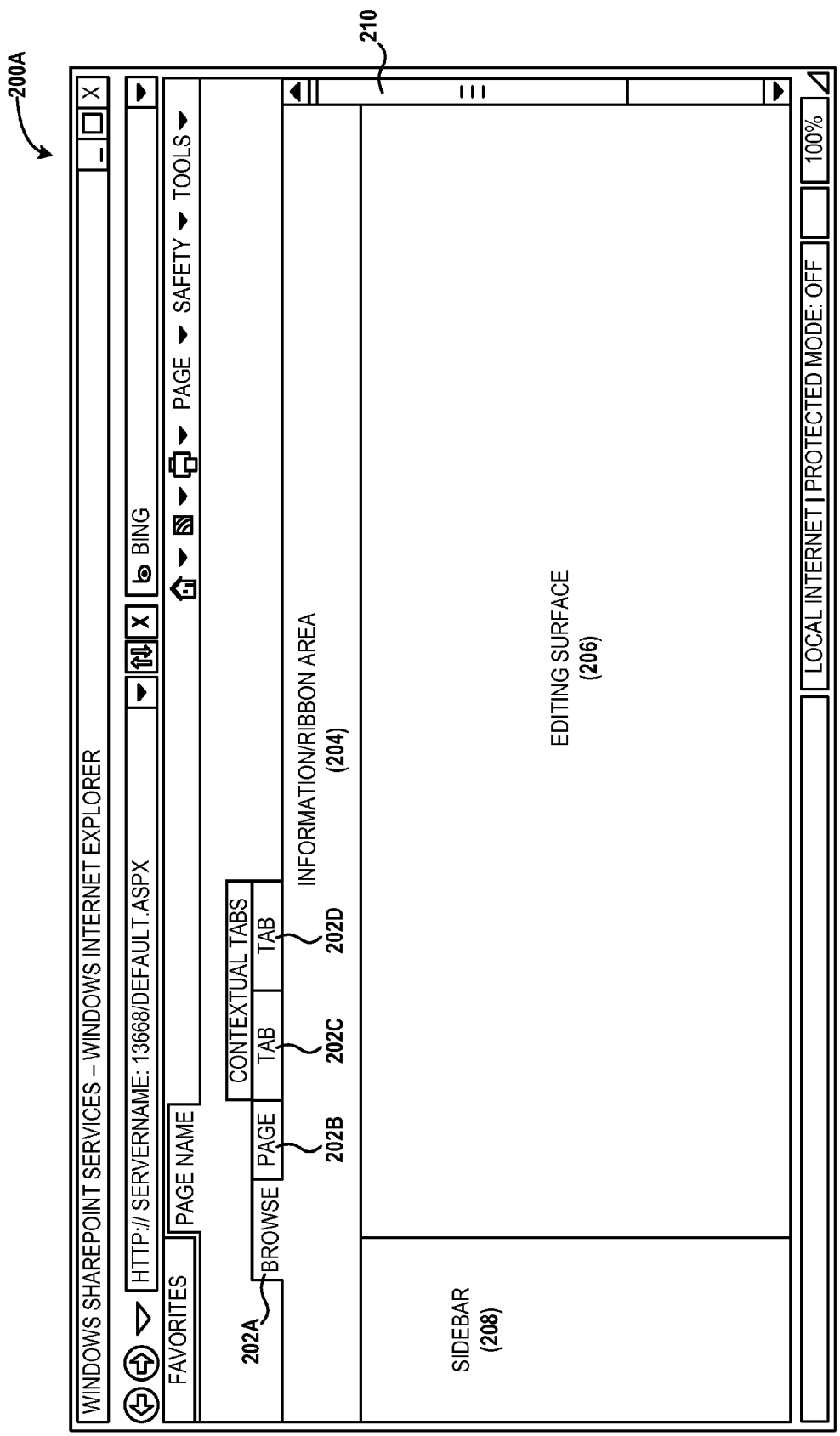
FIGS. 2A-2D are simplified screen diagrams showing aspects of a collapsible tabbed user interface provided in one embodiment disclosed herein.

The following detailed description is directed to technologies for providing a collapsible tabbed user interface. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a tab-based collapsible user interface will be described.

Turning now to FIG. 1, details will be provided regarding one embodiment presented herein for providing a collapsible tabbed user interface. In particular, FIG. 1 is a network diagram showing one illustrative operating environment 100 for the embodiments presented herein. As shown in FIG. 1, the environment 100 includes a client computer 102 coupled to a server computer 104 by way of a network 106. The client computer 102 is configured to execute a Web browser 112 for receiving and displaying Web pages 110 from the server computer 104. In one embodiment, the Web pages 110 are generated by a content management and collaboration server application 108. Each of these components will be described in greater detail below.

According to one implementation, the client computer 102 comprises a standard desktop or laptop computer capable of executing a Web browser 112. It should be appreciated, however, that the client computer 102 may comprise other types of computing devices including, but not limited to, netbooks, set top boxes, electronic book reader devices, wireless cellular telephones, personal digital assistants, game consoles, slate computers, and virtually any other computing device capable of executing a Web browser 112.

The Web browser 112 comprises a conventional Web browser application program capable of receiving and rendering the Web pages 110. The Web browser 112 may comprise, for instance, the INTERNET EXPLORER Web browser application program from MICROSOFT CORPORATION, the SAFARI Web browser application program from APPLE computer, the CHROME Web browser application program from GOOGLE, or another Web browser application program from another manufacturer. It should also be appreciated that the functionality provided by the Web browser 112 for receiving and displaying Web pages 110 may also be integrated with another type of application executing on the client computer 102. Alternatively, the functionality described herein for providing a collapsible tabbed user interface may also be provided by a standalone application executing on the client computer 102. Other implementations will be apparent to those skilled in the art.

The network 106 is a computing network configured for enabling data communications between the client computer 102 and the server computer 104. In one embodiment, the network 106 comprises the Internet, however, it should be appreciated that the network 106 may comprise any type of local area or wide area network. Additionally, the network 106 has been shown in a simplified form. Therefore, it should be appreciated that the network 106 may comprise many different networking components and computer systems distributed over a large geographic area. It should also be appreciated that although FIG. 1 illustrates only a client computer 102 and server computer 104 being connected to the network 106, many other computing devices may also be connected to the network 106 and enabled for data communication over the network 106.

The server computer 104 comprises a standard server computer capable of executing a program for generating the Web pages 110. As described briefly above, the Web pages 110 are generated in one embodiment by the content management and collaboration server application 108. The content management and collaboration server application 108 is an application program that provides functionality for managing content, such as documents, and for enabling users to collaborate on the creation and editing of the content. One example of the content management and collaboration server application 108 is the SHAREPOINT content management and collaboration server application from MICROSOFT CORPORATION of Redmond, Wash. It should be appreciated, however, that the embodiments utilized herein may be utilized with other types of content management and collaboration applications from other manufacturers. It should also be appreciated that although the embodiments presented herein are described in the context of Web pages 110 generated by a content management and collaboration server application 108, the embodiments presented herein may be utilized with other types of server and client applications. In this regard, it should be fully understood that the embodiments described herein are not limited to use with a content management and collaboration server application 108.

As described briefly above, the content management and collaboration server application 108 provides a user interface to a user of the client computer 102 by generating the Web pages 110. The Web browser 112 executing on the client computer 102 can retrieve the Web pages 110 from the server computer 104, render the Web pages 110, and display the Web pages to a user of the client computer 102. According to one implementation, some of the Web pages 110 include a tab-based user interface that can collapse a portion of the user interface when it is unnecessary to display user interface controls for performing commands. In this manner, the available space within a Web browser application window displayed by the Web browser 112 can be used more efficiently. Additional details regarding the tab-based collapsible user interface will be described below with reference to FIGS. 2A-6.

FIGS. 2A-2D are simplified screen diagrams showing aspects of a collapsible tabbed user interface provided in one embodiment disclosed herein. In particular, FIG. 2A is a screen display 200A showing a Web browser application window generated by the Web browser 112. In the example shown in FIG. 2A, the Web browser 112 has generated the collapsible tabbed user interface by rendering a Web page 110. As also shown in FIG. 2A, the collapsible tabbed user interface includes tabs 202A-202D, an information/ribbon area 204 (which will be referred to herein as the "ribbon area" or the "ribbon"), an editing surface 206, and a sidebar 208. Each of these components will be described in greater detail below.

As will be discussed in greater detail herein, the ribbon area 204 is used to display information and to display selectable user interface controls for performing commands. The editing surface 206 is utilized to display and edit information. For instance, the editing surface 206 might be utilized to display a list of documents, to display one of the documents in the list, and to provide functionality for editing one of the documents in the list. The ribbon area 204 might be utilized to display information regarding the documents shown in the editing surface 206. The ribbon area 204 may also be utilized to display user interface controls for performing commands for editing the documents and taking other actions with respect to content shown in the editing surface 206. The sidebar 208 may be utilized to provide controls for navigating between various pages provided by the content management and server application 108 and for accessing other types of functionality.

The tabs 202A-202D are selectable user interface controls which, when selected, cause different content to be displayed in the ribbon area 204, the side bar 208, and the editing surface 206. In particular, the tab 202A, which will be referred to herein as the "browse tab", is a selectable user interface control which, when selected, will cause information to be displayed in the ribbon area 204. The information displayed in the ribbon area 204 may provide general information about the area of the content management and collaboration server application 108 being navigated, general help information, information regarding a document or list shown in the editing surface 206, or other types of information. When the browse tab 202A is selected, the ribbon area 204 does not include any user interface controls for performing commands on content shown in the editing surface 206. In this manner, the browse tab 202A is suitable for selection when a user is simply browsing content in the editing surface 206 and is not making edits or performing functionality that requires the initiation of commands.

In one implementation, when the browse tab 202A is selected, a vertical scroll bar 210 is displayed adjacent to both the ribbon area 204 and the editing surface 206. When a user of the client computer 102 selects the vertical scroll bar 210 in order to scroll the contents of the editing surface 206, the ribbon area 204 and the editing surface 206 are both scrolled. The tabs 202A-202D are not scrolled and will remain on screen. In contrast, the ribbon area 204 may scroll out of view, thereby effectively collapsing the ribbon area 204 and allowing a greater portion of the editing surface 206 to be displayed.

Figure 2B:
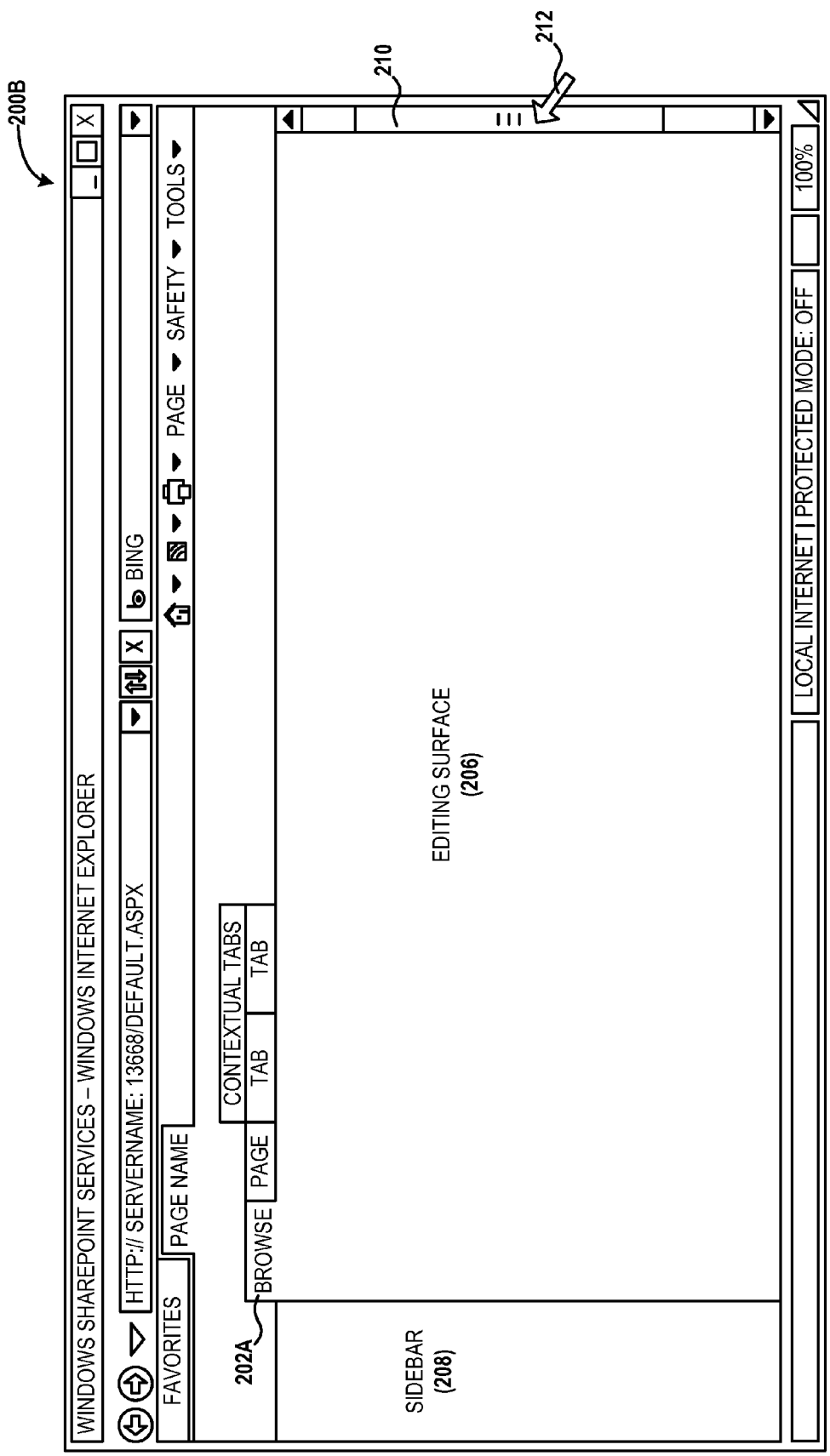

In the screen display 200B showing FIG. 2B, the browse tab 202A has been selected, the scroll bar 210 has been selected with mouse cursor 212, and the scroll bar has been dragged down, thereby scrolling the ribbon area 204 out of view. As discussed above, the tabs 202A-202D remain visible even though the ribbon area 204 has been scrolled out of view. It should be appreciated that, in one embodiment, the contents of the sidebar 208 are also scrolled in response to the utilization of the scroll bar 210. As mentioned above, it should be appreciated that the user interface controls described herein are merely illustrative and that other types of user interface controls may be utilized. For instance, although the figures presented herein include a vertical scroll bar 210, other types of user interface controls might also be utilized to initiate a scrolling action. Additionally, a keyboard or other type of user interface device might also be utilized to initiate a scrolling action without the use of an on-screen user interface control.

Figure 2C:
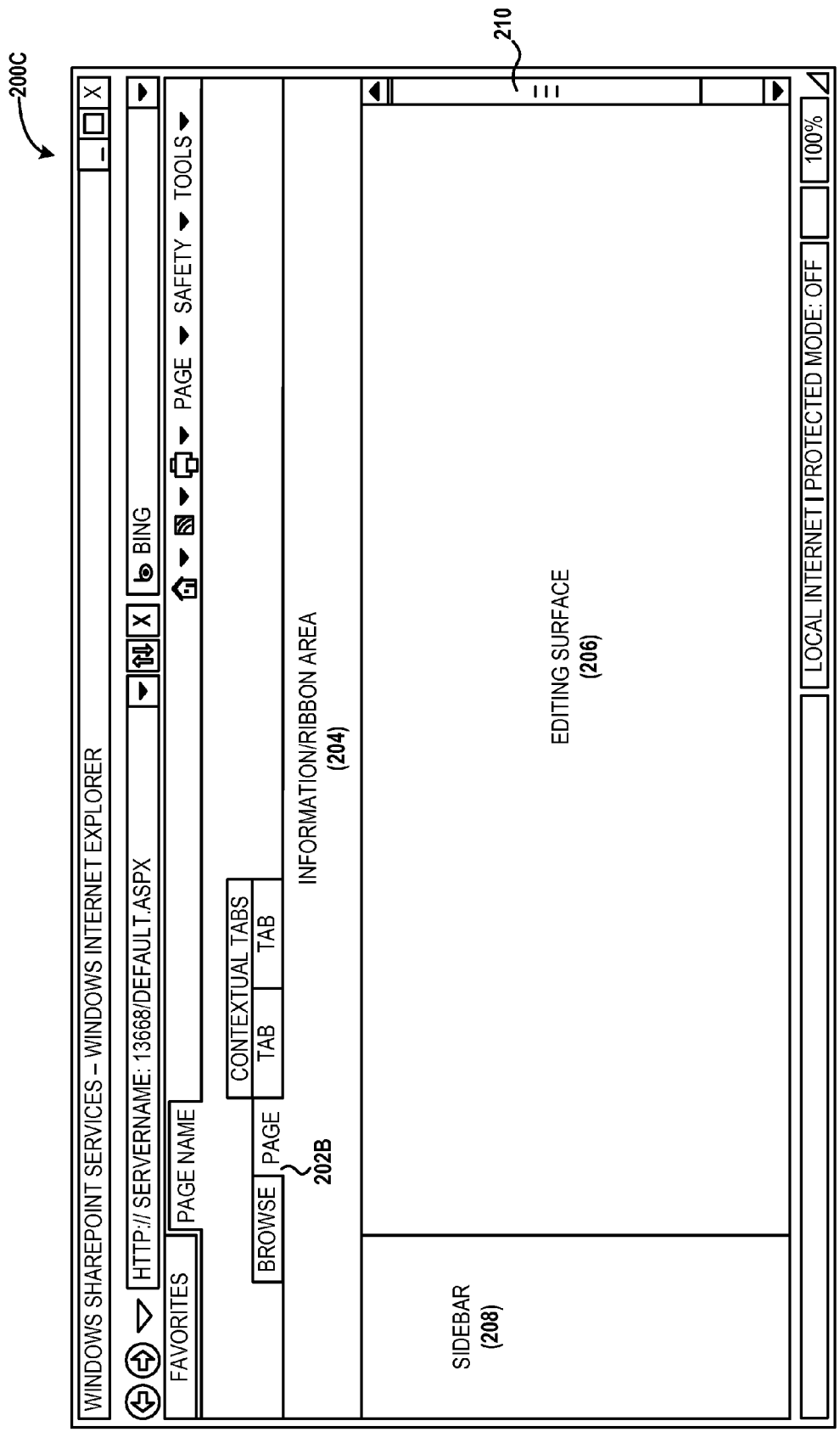

Referring now to FIG. 2C, additional details regarding the collapsible tabbed user interface provided herein will be described. In the example screen display 200C shown in FIG. 2C, a tab 202B (which will be referred to herein as a "page tab") has been selected. A page tab is selected in order to provide functionality for performing commands on content displayed in the editing surface 206. For instance, when the page tab 202B is selected, user interface controls for performing commands might be displayed in the ribbon area 204. The user interface controls shown in the ribbon area 204 can be selected to perform commands on the content displayed in the editing surface 206.

It should be appreciated that the tabbed user interface provided herein also includes the tabs 202C-202D (which may be referred to herein as "contextual tabs"). When selected, the contextual tabs also cause user interface controls to be displayed in the ribbon area 204 for performing functions on content within the editing surface 206. The contextual tabs 202C-202D provide user interface controls in the ribbon area 204 that are customized based upon the content of the editing surface 206. In this manner, the contextual tabs 202C-202D may be utilized to provide user interface controls in the ribbon area 204 appropriate for the content displayed in the editing surface 206, while hiding user interface controls for initiating commands that are inappropriate for the content shown in the editing surface 206. As will be described in greater detail below, an appropriate contextual tab 202C-202D may be auto-selected in response to commands performed in the editing surface 206. For instance, a tab 202C with the appropriate commands for editing a document may be auto-selected in response to receiving a request from the user to edit the document. Additional details regarding this process will be provided below.

Figure 2D:
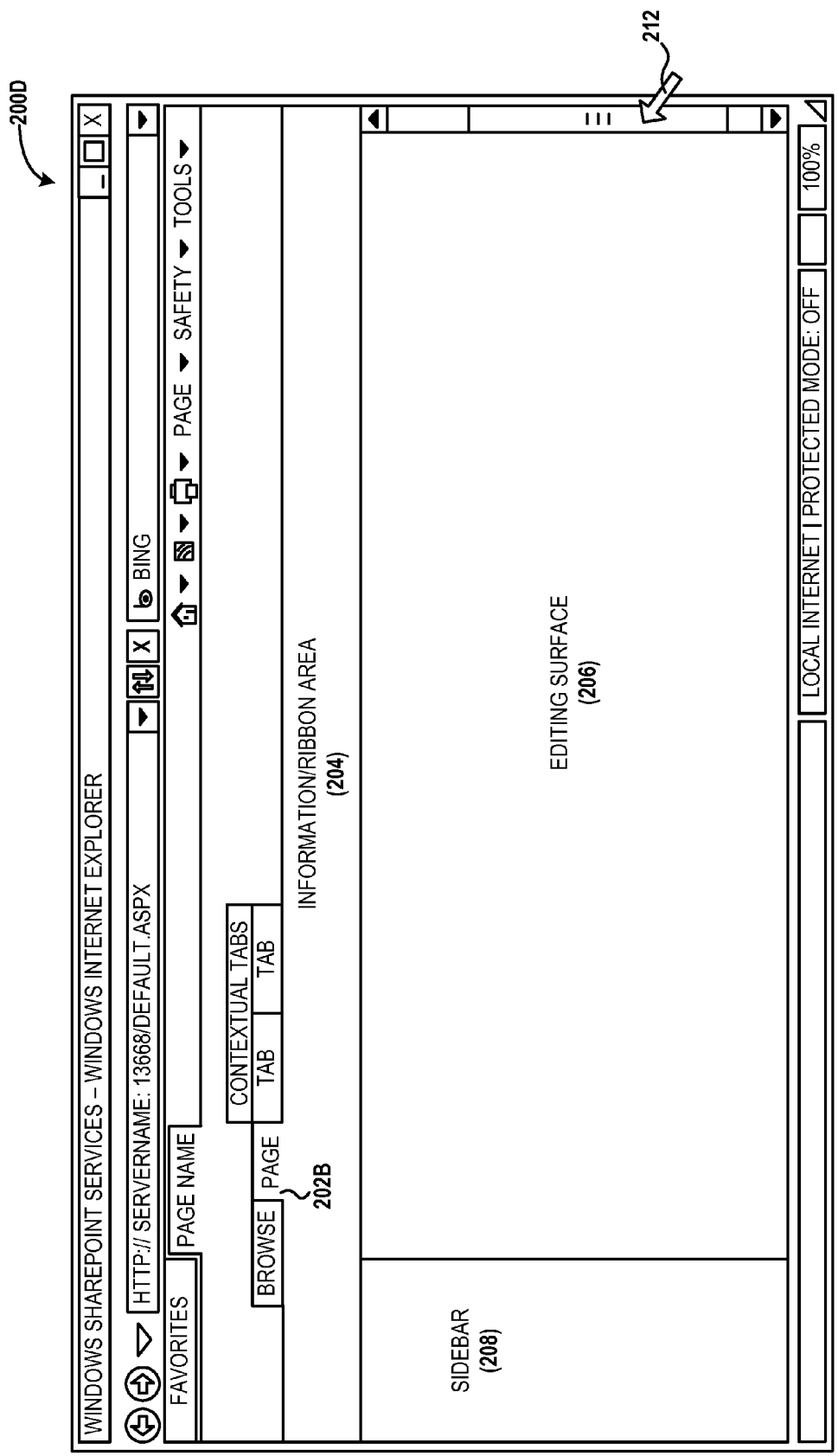

In the example shown in FIG. 2C, the page tab 202B has been selected. As described briefly above, selection of the page tab 202B will cause user interface controls to be displayed in the ribbon area 204 for performing commands on content displayed in the editing surface 206. Additionally, when a page tab 202B or a contextual tab 202C-202D is selected, a vertical scroll bar 210 may be displayed adjacent to the editing surface 206, but not adjacent to the ribbon area 204. When the vertical scroll bar 210 is selected in order to scroll the content of the editing surface 206, the contents of the editing surface 206 are scrolled but the ribbon area 204 is not scrolled. In this manner, the user interface controls for performing commands displayed in the ribbon area 204 are continuously displayed for use even when the contents of editing surface 206 are scrolled. This is illustrated in FIG. 2D, where a mouse cursor 212 has been utilized to drag the vertical scroll bar 210. In this example, the editing surface 206 has been scrolled while the ribbon area 204 has remained in view. Additional details regarding this process will be provided below with reference to FIGS. 3A-6.

Figure 3A:
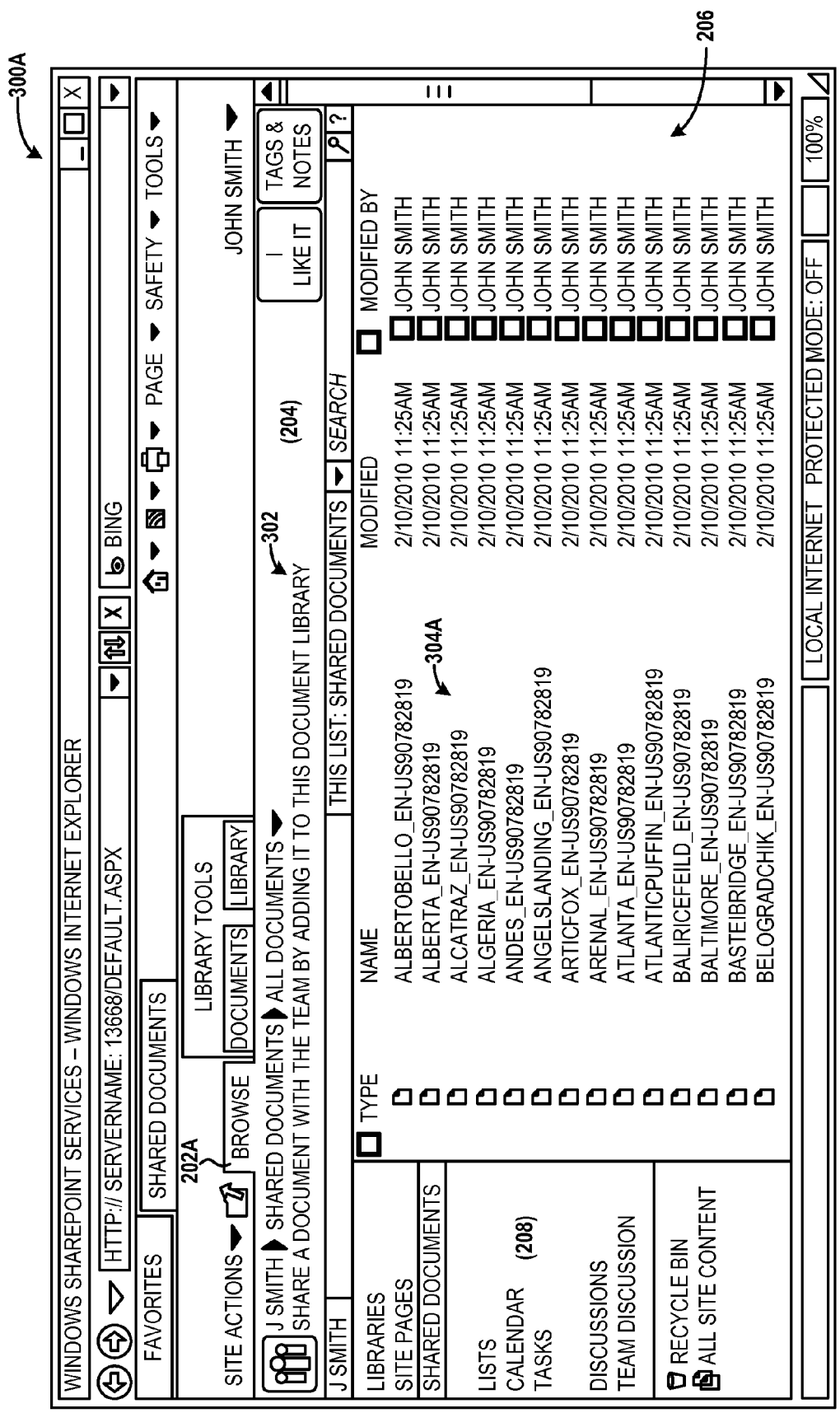
FIGS. 3A-4F are screen diagrams showing aspects of a collapsible tabbed user interface when utilized in conjunction with a content management and collaboration server application in one embodiment presented herein.
Figure 3B:
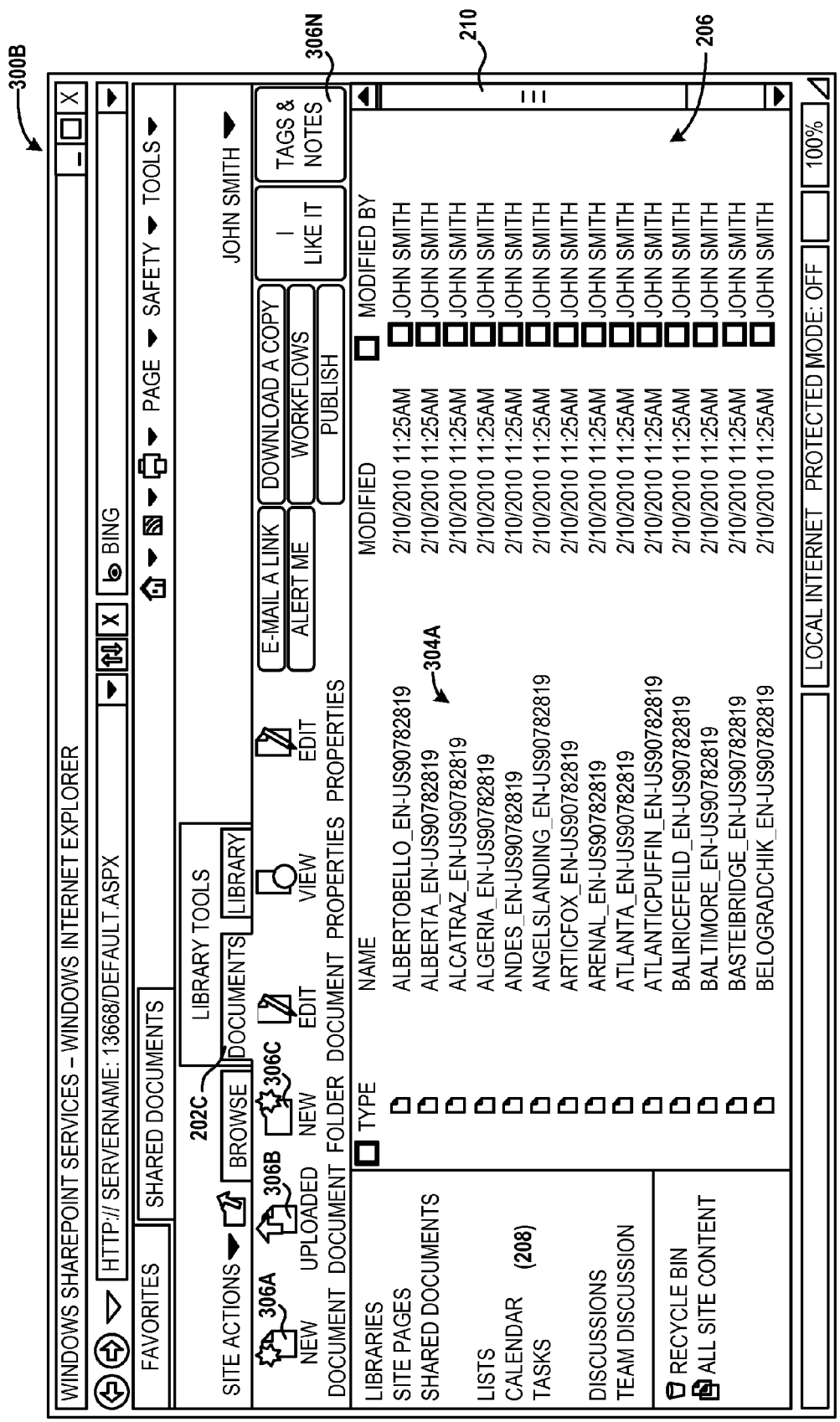

FIGS. 3A-3B are screen diagrams showing aspects of a collapsible tabbed user interface provided herein when used in conjunction with the content management and collaboration server application 108. In particular, FIG. 3A is a screen display 300A generated by the Web browser 112 after displaying a Web page 110 provided by the content management and collaboration server application 108. In the example screen display 300A shown in FIG. 3A, the browse tab 202A has been selected. Consequently, information 302 has been displayed in the ribbon area 204. Additionally, a scroll bar 210 has been displayed adjacent to the ribbon area 204 and the editing surface 206. A list 304A has also been displayed in the editing surface 206. An appropriate user interface control in the sidebar 208 has been selected to thereby display the list 304A.

Because the browse tab 202A has been selected and the scroll bar 210 has been displayed adjacent to both the ribbon area 204 and the editing surface 206, the ribbon area 204 may be scrolled out of the screen display 300A in response to use of the scroll bar 210. In this way, a greater portion of the screen display 300A can be utilized to show the list 304A within the editing surface 206.

FIG. 3B shows a screen display 300B provided by the Web browser 112 following the selection of the contextual tab 202C. In response to the selection of the contextual tab 202C, the contents of the ribbon area 204 have been modified to include selectable user interface controls 306A-306N for performing commands. For instance, the user interface control 306A corresponds to a command for creating a new document. The user interface control 306B corresponds to a command for uploading a document. The user interface control 306C corresponds to a command for creating a new folder. Other commands in the ribbon area might include commands for editing a document, viewing properties of a document, editing properties of a document, downloading a document, emailing a link to a document, workflows, tags and notes, and other commands.

It should be appreciated that the commands corresponding to the user interface shown in the ribbon area 204 generally correspond to the content shown in the editing surface 206. For instance, in the example shown in FIG. 3B, the editing surface 206 is utilized to display the list 304A, which is a list of shared documents. By selecting the user interface control 306A, a user may initiate a command for adding a new document to the list 304A. Similarly, a user may select the user interface control 306B for uploading a document to the list 304A. Other commands may similarly be performed with respect to the content shown in the editing surface 206. Other commands might also be represented by user interface controls within the ribbon area 204.

As also illustrated in FIG. 3B, because a contextual tab 202C has been selected, the vertical scroll bar 210 is displayed adjacent only to the editing surface 206. The vertical scroll bar is not displayed adjacent to the ribbon area 204. In this manner, use of the vertical scroll bar 210 will cause only the contents of the editing surface 206 to be scrolled. The ribbon area will remain within the screen display 300B even while the contents of the editing surface 206 are being scrolled.

Figure 4A:
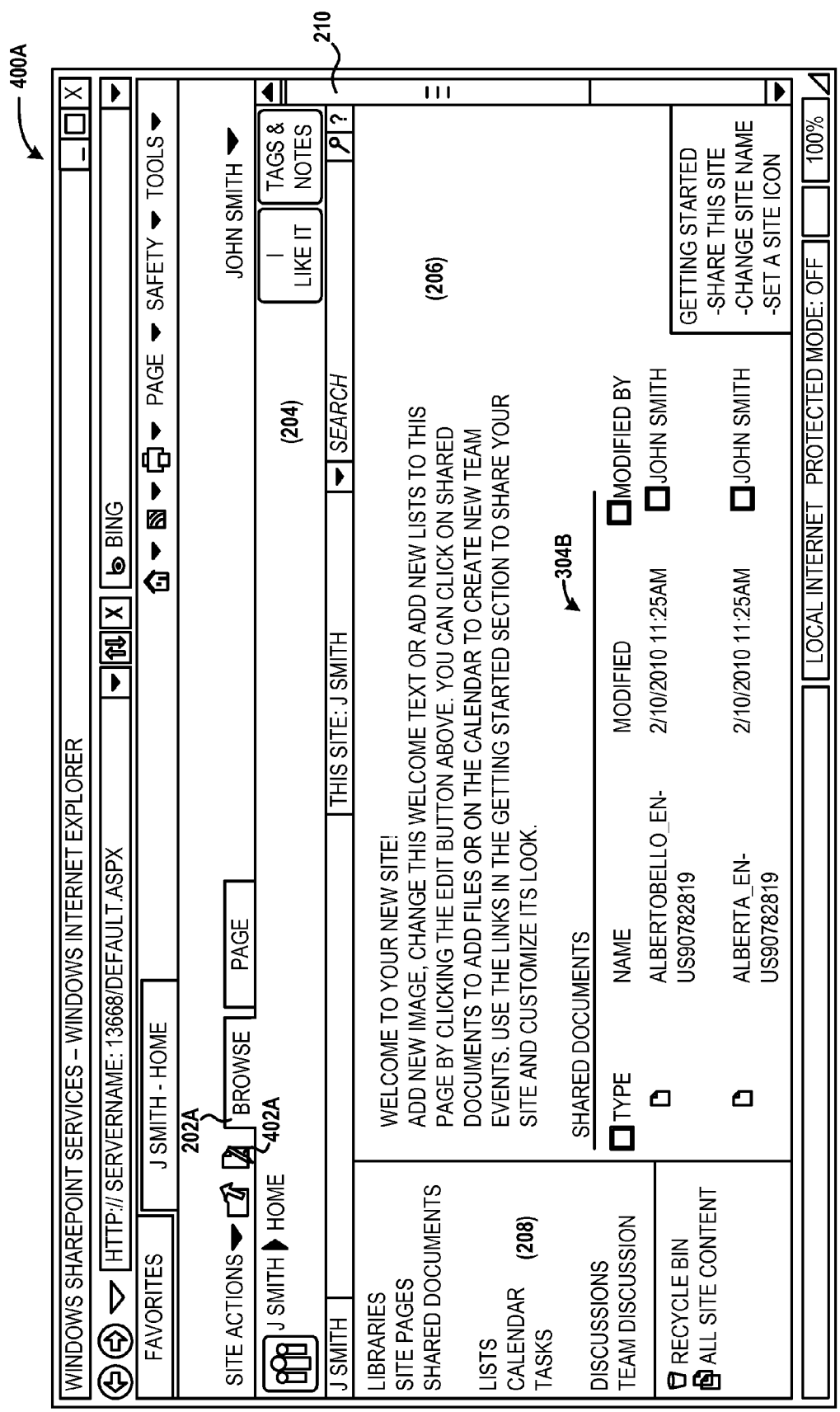
Figure 4B:
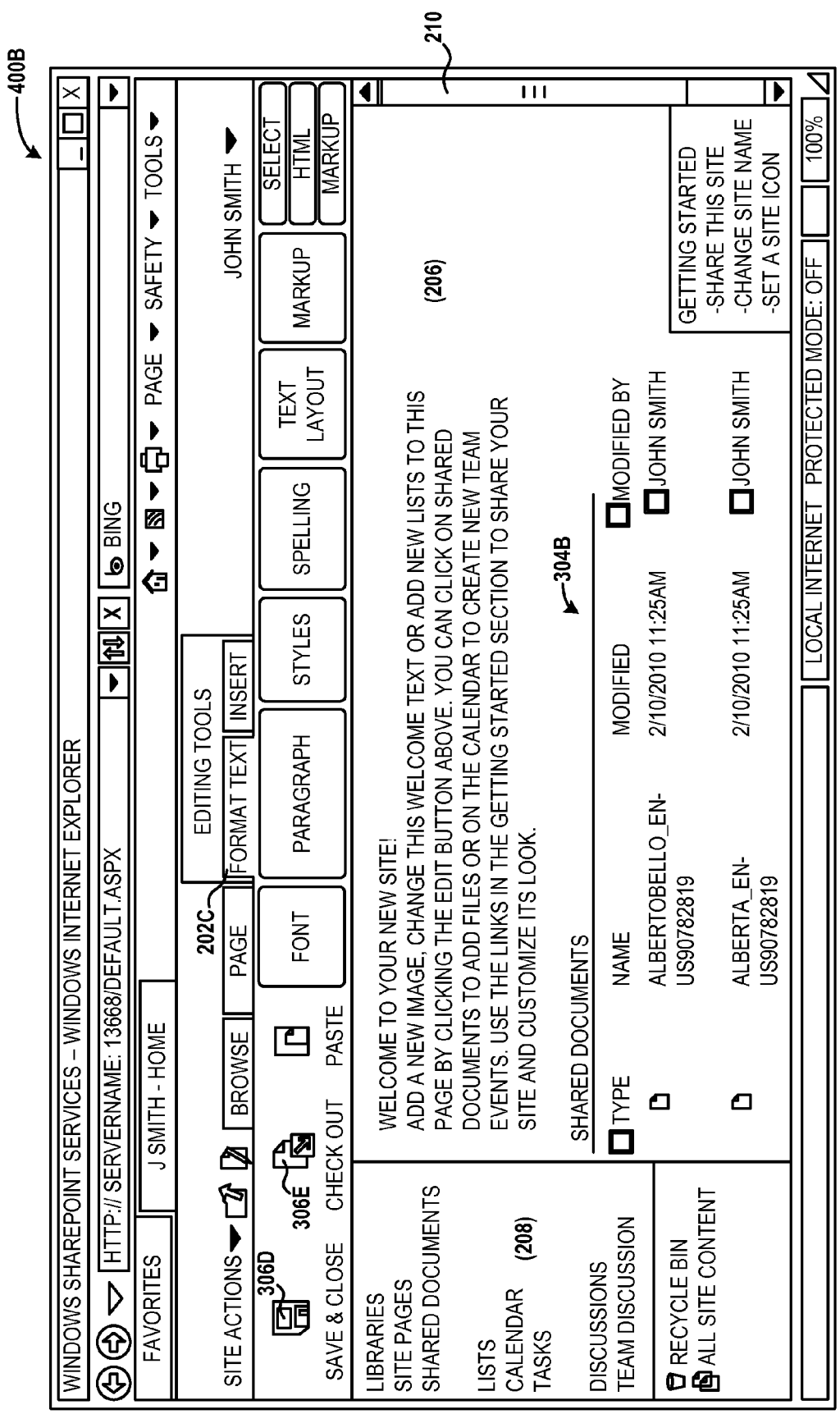

Turning now to FIGS. 4A-4F, several additional screen diagrams will be described that show additional aspects of the collapsible tabbed user interface provided by the content management and collaboration server application 108 in one embodiment described herein. In the example screen display 400A shown in FIG. 4A, the browse tab 202A has been displayed thereby showing information in the ribbon area 204. Because the browse tab 202A has been displayed, the vertical scroll bar 210 has also been displayed adjacent to both the ribbon area 204 and the editing surface 206. In the example shown in FIG. 4A, a list 304B has been shown in the editing surface 206. In this example, an edit icon 402A has also been displayed adjacent to the browse tab 202A. In response to the selection of the icon 402A, the screen display shown in FIG. 4B is displayed.

In the screen display 400B shown in FIG. 4B, the contextual tab 202C has been selected in response to the selection of the icon 402A. Consequently, user interface controls for performing commands have been displayed in the ribbon area 204. As an example, the user interface icon 306D corresponds to a command for saving and closing, and the user interface icon 306E corresponds to a command for checking out a document shown in the list 304B. Additionally, because the contextual tab 202C has been selected, the vertical scroll bar 210 has been displayed adjacent only to the editing surface 206. The vertical scroll bar 210 has not been displayed adjacent to the ribbon area 204. Consequently, use of the vertical scroll bar 210 will cause only the contents of the editing surface 206 to be scrolled.

Figure 4C:
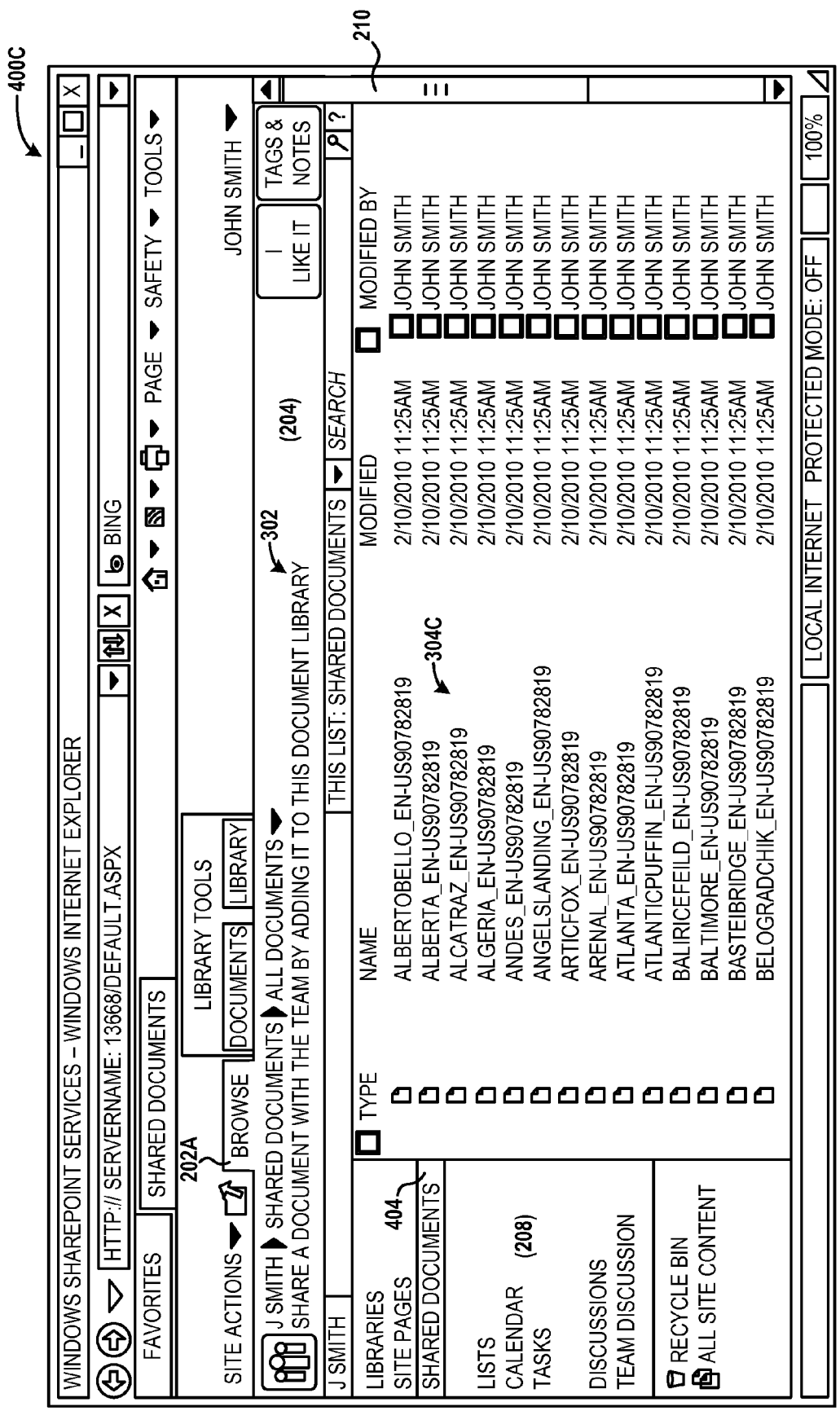
Figure 4D:
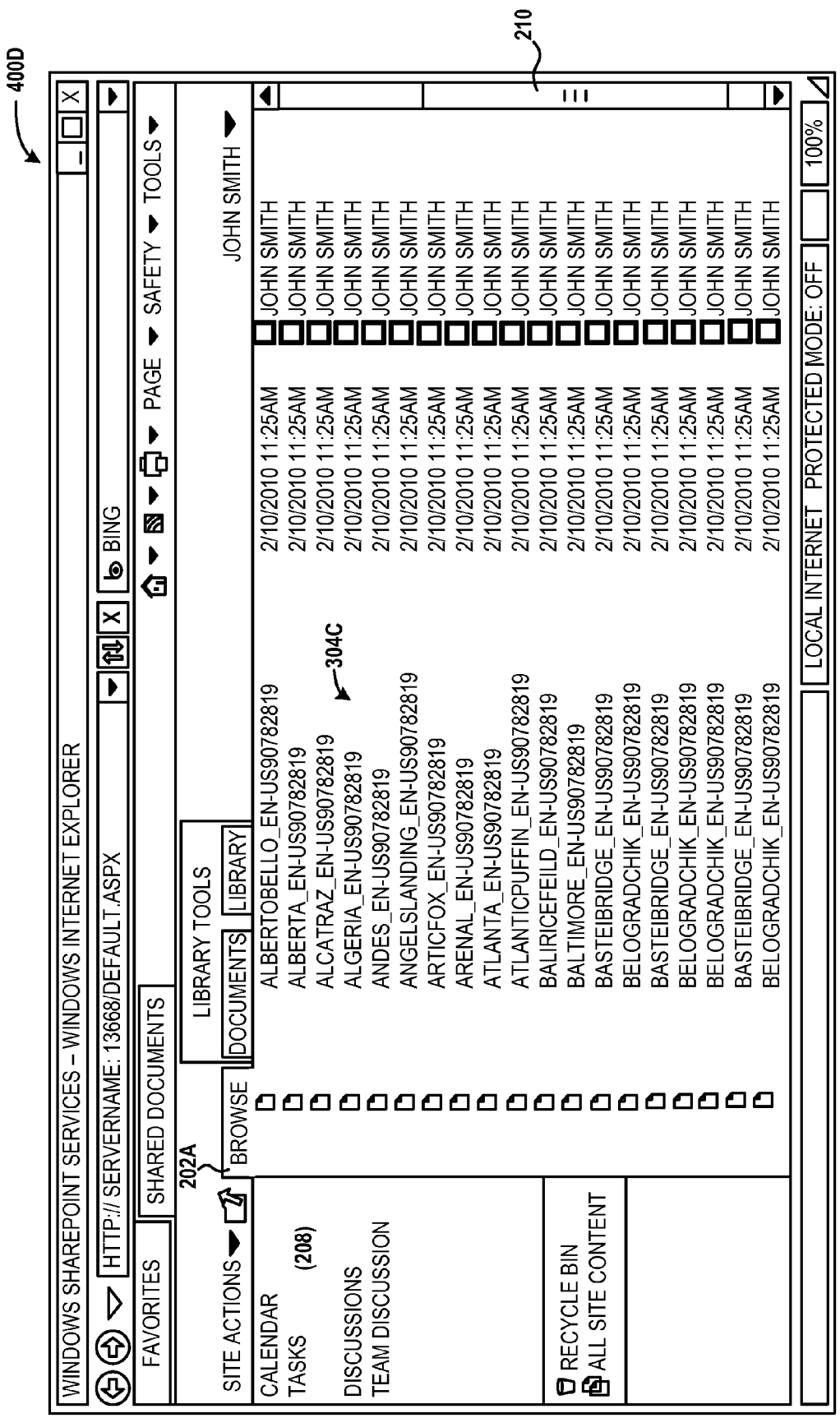

In the example screen display 400C shown in FIG. 4C, a user has selected the browse tab 202A. Consequently, the user interface controls for performing commands have been removed from the ribbon area 204 and information 302 has been displayed therein. Additionally, the vertical scroll bar 210 has been displayed adjacent to both the ribbon area 204 and the editing surface 206. As a result, the vertical scroll bar 210 can be utilized to scroll the ribbon area 204 out of the display 400C, thereby freeing an additional portion of the display for displaying the list 304C. This is illustrated in FIG. 4D.

Figure 4E:
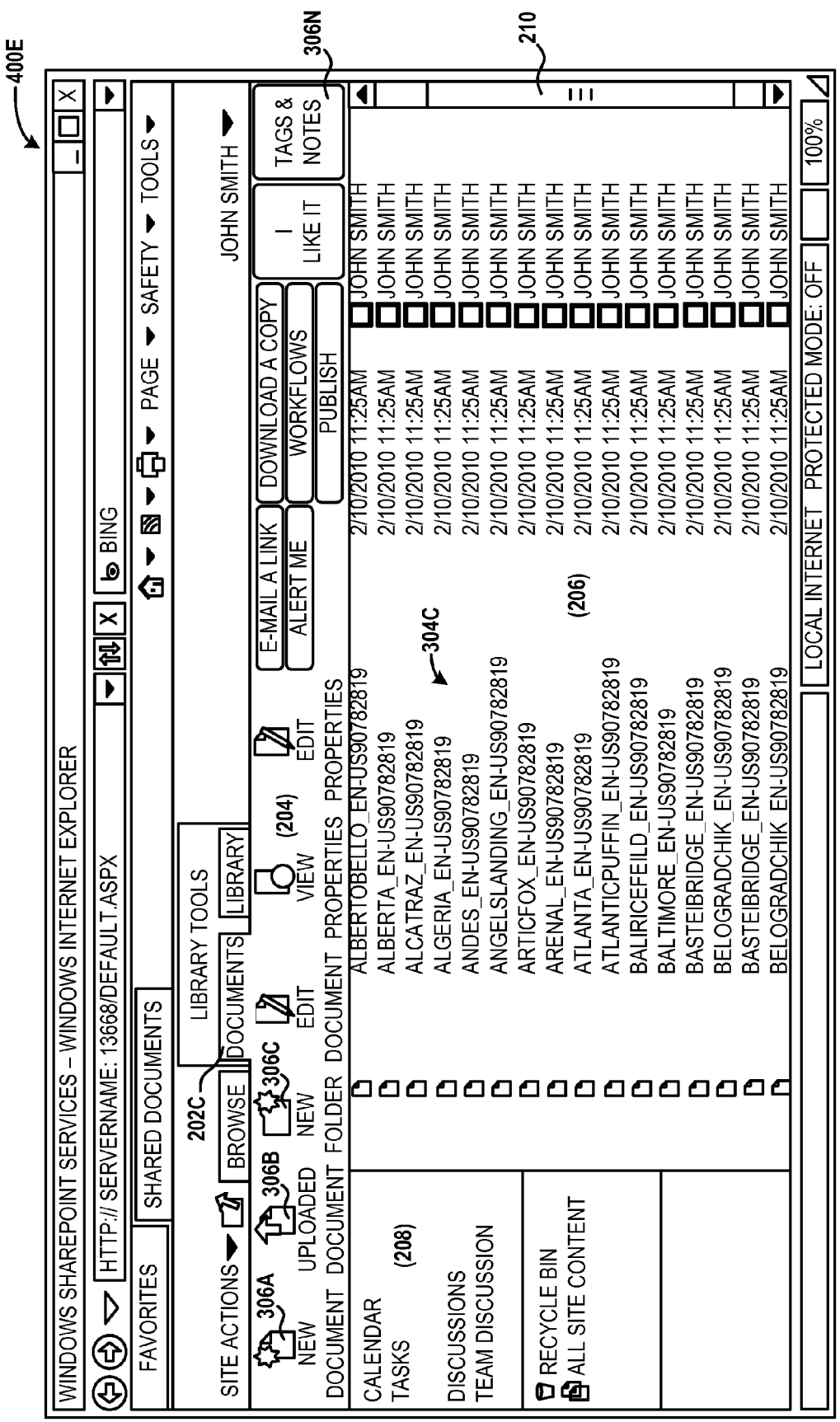
Figure 4F:
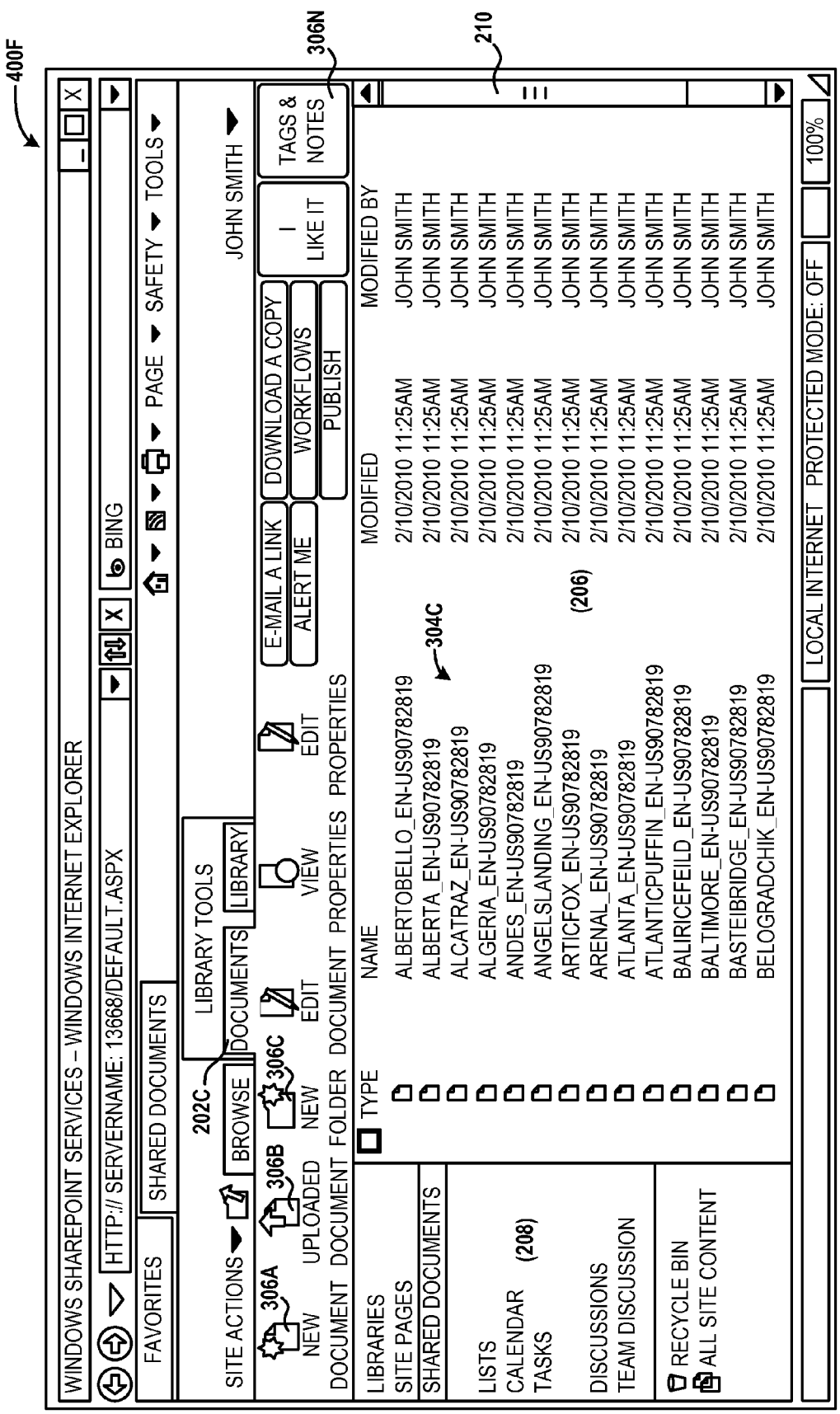

In FIG. 4E, the contextual tab 202C has been selected, thereby causing user interface controls 306A-306N for performing commands to be displayed in the ribbon area 204. In this example, the vertical scroll bar 210 has been utilized to scroll the list 304C shown in the editing surface 206. It should be appreciated that the list 304C has been scrolled without causing the ribbon area 204 to also be scrolled. In this way the commands available by way of the ribbon area 204 are made available to a user at all times when a page or contextual tab is selected. In the example screen display 400F shown in FIG. 4F, the vertical scroll bar 210 has been utilized to scroll back to the top of the list 304C shown in the editing surface 206.

Figure 5:
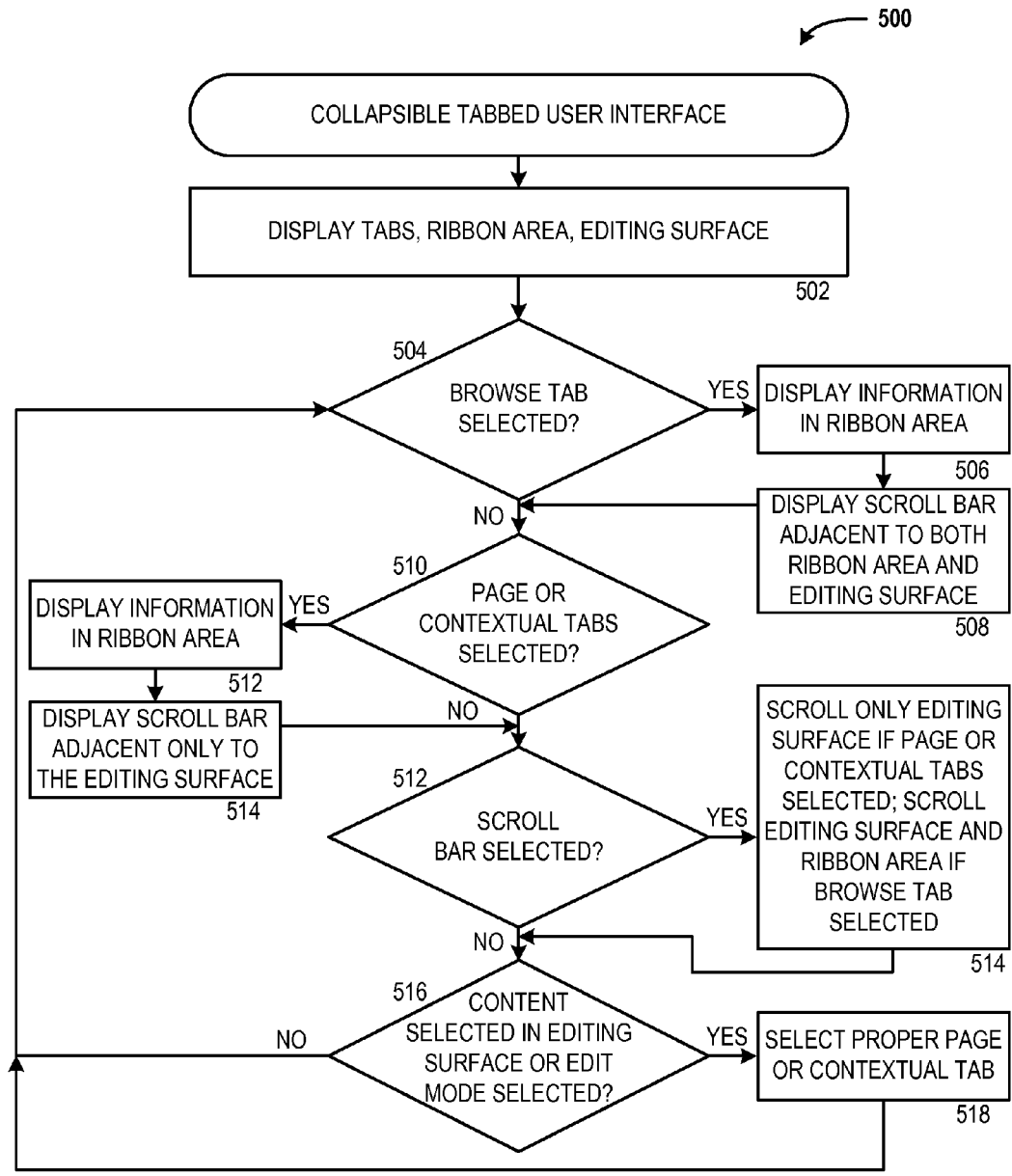
FIG. 5 is a flow diagram illustrating one routine for providing a collapsible tabbed user interface according to one embodiment disclosed herein.

Turning now to FIG. 5, additional details will be provided regarding the embodiments presented herein for a collapsible tabbed user interface. In particular, FIG. 5 is a flow diagram showing a routine 500 that shows aspects of an illustrative process for providing a collapsible tabbed user interface in one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the tabs 202A-202D, ribbon area 204, and editing surface 206 are displayed. As described above, the tabs 202A-202D may be displayed adjacent to one another and above the ribbon area 204. The ribbon area 204 may be displayed adjacent to and above the editing surface 206. It should be appreciated, however, that the arrangement of these elements may be modified without affecting the functionality described herein. For instance, the tabs 202A-202D may be displayed in a vertical orientation rather than the horizontal orientation shown in the figures. Once the tabs 202A-202D, the ribbon area 204, and the editing surface 206 have been displayed, the routine 500 proceeds from operation 502 to operation 504.

At operation 504, a determination is made as to whether the browse tab 202A has been selected. If so, the routine 500 proceeds to operation 506 where information is displayed in the ribbon area 204. As discussed above, when the browse tab 202A is selected, no user interface controls for performing commands are displayed in the ribbon area 204 in one embodiment. In other embodiments, user interface controls for performing commands may be displayed in the ribbon area 204 when the browse tab 202A is selected. From operation 506, the routine 500 proceeds to operation 508, where the vertical scroll bar 210 is also displayed adjacent to both the ribbon area 204 and the editing surface 206. From operation 508, the routine 500 proceeds to operation 510.

If, at operation 504, it is determined that the browse tab 202A has not been selected, the routine 500 proceeds to operation 510. At operation 510, a determination is made as to whether a page tab 202B or one of the contextual tabs 202C-202D have been selected. If so, the routine 500 proceeds to operation 512, where user interface controls for performing commands are displayed in the ribbon area 204. As discussed above, the particular user interface controls shown in the ribbon area 204 may be customized for the content currently displayed in the editing surface 206. In this way, user interface controls for commands that are inappropriate for the content displayed in the editing surface 206 are not displayed. From operation 512, the routine 500 proceeds to operation 514 where the vertical scroll bar 210 is displayed adjacent only to the editing surface 206. The routine 500 then proceeds from operation 514, to operation 512.

At operation 512, a determination is made as to whether the vertical scroll bar 210 has been selected. If so, the routine 500 proceeds from operation 512 to operation 514. At operation 514, only the contents of the editing surface 206 are scrolled if the page tab 202B or one of the contextual tabs 202C-202D have been selected. If the browse tab 202A has been selected, both the ribbon area and the editing surface 206 are scrolled. The routine 500 then proceeds from operation 514 to operation 516.

As described briefly above, the contextual tabs 202C-202D may automatically be selected based upon operations performed in the editing surface 206 or elsewhere within the collapsible tabbed user interface provided herein. In this way, the appropriate tab can be selected and opened in response to user action within the collapsible tabbed user interface. Accordingly, at operation 516 a determination is made as to whether a tab should be auto-selected. As discussed above, different types of actions might cause a tab to be auto-selected. For instance, in one embodiment, a tab might be auto-selected when content is selected in the editing surface 206 or an edit mode command is selected, such as described above with respect to FIGS. 4A-4B. If a tab is to be auto-selected, the routine 500 proceeds from operation 516 to operation 518 where the appropriate page tab 202B or contextual tab 202C-202D is selected and opened for the performed command or selected content. The routine 500 then proceeds from operation 518 to operation 504 where the above described processes is again repeated.

Figure 6:
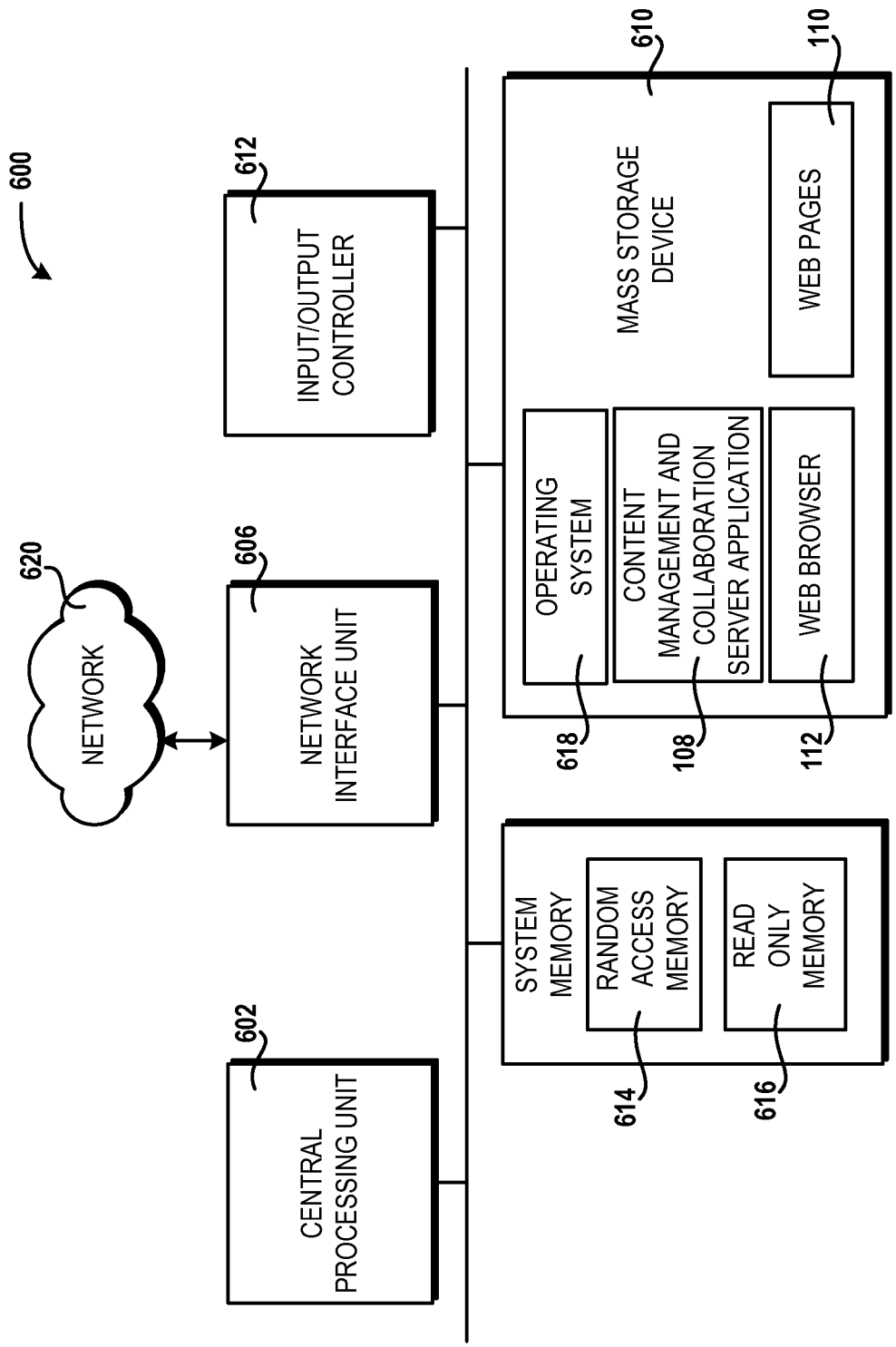
FIG. 6 is a computer architecture diagram showing an illustrative computer hardware and software architecture for a computing system capable of implementing the embodiments presented herein.

FIG. 6 shows an illustrative computer architecture for a computer 600 capable of executing the software components described herein for providing a collapsible tabbed user interface. The computer architecture shown in FIG. 6 illustrates a conventional desktop, laptop computer, or server computer and may be utilized to execute the content management and collaboration and server application 108 or the Web browser 112 described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system ("BIOS") containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the content management and collaboration server application 108 and the Web browser 112. The mass storage device 610 and RAM 614 may also store other program modules and data, such as the Web pages 110.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for providing a collapsible tabbed user interface have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a collapsible tabbed user interface, the method comprising:
   displaying a ribbon area;
   displaying an editing surface;
   displaying a first selectable user interface tab which, when selected, will cause information regarding the editing surface to be displayed in the ribbon area;
   displaying a second selectable user interface tab which, when selected, will cause selectable user interface controls for performing commands to be displayed in the ribbon area;
   displaying a vertical scroll bar adjacent to the ribbon area and the editing surface when the first selectable user interface tab is selected; and
   displaying a vertical scroll bar adjacent to only the editing surface when the second selectable user interface tab is selected.

2. The computer-implemented method of claim 1, further comprising:
   receiving a selection of the vertical scroll bar when the first selectable user interface tab is selected; and
   in response to receiving the selection of the vertical scroll bar, scrolling the ribbon area and the editing surface.

3. The computer-implemented method of claim 1, further comprising:
   receiving a selection of the vertical scroll bar when the second selectable user interface tab is selected; and
   in response to receiving the selection of the vertical scroll bar, scrolling the editing surface and not scrolling the ribbon area.

4. The computer-implemented method of claim 1, wherein the selectable user interface controls for performing commands displayed in the ribbon area when the second selectable user interface tab is selected are customized based upon contents of the editing surface.

5. The computer-implemented method of claim 1, further comprising selecting the second selectable user interface tab in response to a command performed in the editing surface.

6. The computer-implemented method of claim 1, wherein the ribbon area is displayed adjacent to and below the first and second selectable user interface tabs.

7. The computer-implemented method of claim 6, wherein the editing surface is displayed adjacent to and below the ribbon area.

8. The computer-implemented method of claim 7, wherein the second selectable user interface tab is displayed adjacent to the first selectable user interface tab.

9. A computer-readable storage medium that is not a signal, the computer-readable storage medium having computer-executable instructions stored thereupon that, when executed by a computer, cause the computer to:
   display a ribbon area;
   display an editing surface;
   display a first selectable user interface tab;
   display a second selectable user interface tab;
   receive a selection of the first selectable user interface tab and, in response thereto, to display information regarding the editing surface in the ribbon area;
   receive a selection of the second selectable user interface tab and, in response thereto, to display selectable user interface controls in the ribbon area for performing commands when selected;
   display a vertical scroll bar adjacent to the ribbon area and the editing surface when the first selectable user interface tab is selected; and
   display a vertical scroll bar adjacent to only the editing surface when the second selectable user interface tab is selected.

10. The computer-implemented method of claim 1, wherein the collapsible tabbed user interface is displayed within a web browser application executed by a computer.

11. The computer-readable medium of claim 9, having further computer-executable instructions stored thereupon which, when executed by the computer, will cause the computer to:
   receive a selection of the vertical scroll bar when the first selectable user interface tab is selected; and in response to receiving the selection of the vertical scroll bar, to scroll the ribbon area and the editing surface.

12. The computer-readable medium of claim 11, having further computer-executable instructions stored thereupon which, when executed by the computer, will cause the computer to:
receive a selection of the vertical scroll bar when the second selectable user interface tab is selected; and
in response to receiving the selection of the vertical scroll bar, to scroll the editing surface and not scroll the ribbon area.

13. The computer-readable medium of claim 12, wherein the selectable user interface controls for performing commands displayed in the ribbon area when the second selectable user interface tab is selected are customized based upon contents of the editing surface.

14. The computer-readable medium of claim 13, wherein the ribbon area is displayed adjacent to and below the first and second selectable user interface tabs, wherein the editing surface is displayed adjacent to and below the ribbon area, and wherein the second selectable user interface tab is displayed adjacent to the first selectable user interface tab.

15. A computer-implemented method for providing a collapsible tabbed user interface, the method comprising:
displaying a first selectable user interface tab;
displaying a second selectable user interface tab adjacent to the first selectable user interface tab;
displaying a ribbon area adjacent to and below the first and second selectable user interface tabs;
displaying an editing surface adjacent to and below the ribbon area;
receiving a selection of the first selectable user interface tab and, in response thereto, displaying information regarding the editing surface in the ribbon area;
receiving a selection of the second selectable user interface tab and, in response thereto, displaying selectable user interface controls in the ribbon area for performing commands;
displaying a vertical scroll bar adjacent to the ribbon area and the editing surface when the first selectable user interface tab is selected; and
displaying a vertical scroll bar adjacent to only the editing surface when the second selectable user interface tab is selected.

16. The computer-implemented method of claim 15, further comprising receiving a selection of the vertical scroll bar when the first selectable user interface tab is selected and, in response thereto, scrolling the ribbon area and the editing surface.

17. The computer-implemented method of claim 16, further comprising receiving a selection of the vertical scroll bar when the second selectable user interface tab is selected and, in response thereto, scrolling the editing surface and not scrolling the ribbon area.

18. The computer-implemented method of claim 17, wherein the selectable user interface controls for performing commands displayed in the ribbon area when the second selectable user interface tab is selected are customized based upon contents of the editing surface.

19. The computer-implemented method of claim 18, further comprising selecting the second selectable user interface tab in response to a command performed in the editing surface.

20. The computer-implemented method of claim 15, wherein the collapsible tabbed user interface is displayed within a web browser application executed by a computer.

* * * * *